United States Patent [19]
Derby

[11] Patent Number: 5,746,862
[45] Date of Patent: May 5, 1998

[54] METHOD OF MAKING A LINER FOR ROLL-OFF WASTE CONTAINERS

[75] Inventor: Norwin C. Derby, Dallas, Tex.

[73] Assignee: Super Sack Mfg. Corp., Dallas, Tex.

[21] Appl. No.: 548,760

[22] Filed: Oct. 26, 1995

[51] Int. Cl.$^6$ .............................. B31B 33/60; B32B 31/02
[52] U.S. Cl. ..................... 156/198; 156/200; 156/204; 156/227; 156/253; 156/251; 156/267; 156/271; 493/197
[58] Field of Search ...................................... 156/198, 200, 156/204, 251, 271, 227, 253, 267; 493/193, 194, 197, 231, 254

[56] References Cited

U.S. PATENT DOCUMENTS

| | | |
|---|---|---|
| 977,698 | 12/1910 | Barksdale . |
| 2,215,689 | 9/1940 | Dickson . |
| 2,216,527 | 10/1940 | Weiss et al. . |
| 2,524,584 | 10/1950 | Zehr . |
| 2,574,345 | 11/1951 | Montgomery . |
| 2,653,888 | 9/1953 | Hyman, Jr. ........................ 156/271 |
| 2,683,262 | 7/1954 | Foss . |
| 2,712,797 | 7/1955 | Woehrle et al. . |
| 2,861,735 | 11/1958 | Faltin . |
| 2,998,340 | 8/1961 | Conway et al. . |
| 3,069,978 | 12/1962 | Hoeppner . |
| 3,167,209 | 1/1965 | Jones . |
| 3,219,240 | 11/1965 | Campbell . |
| 3,269,278 | 8/1966 | Olstad ........................ 156/271 |
| 3,306,328 | 2/1967 | Markus . |
| 3,349,991 | 10/1967 | Kessler . |
| 3,411,419 | 11/1968 | Becker et al. ........................ 156/271 |
| 3,422,867 | 1/1969 | Wu . |
| 3,459,357 | 8/1969 | Egger et al. . |
| 3,468,102 | 9/1969 | Farrar et al. . |
| 3,481,461 | 12/1969 | Paxton . |
| 3,539,360 | 11/1970 | Wood . |
| 3,570,751 | 3/1971 | Trewella . |
| 3,617,418 | 11/1971 | Miller . |
| 3,620,884 | 11/1971 | Peterson ........................ 156/251 |
| 3,834,528 | 9/1974 | Pickford . |
| 3,888,163 | 6/1975 | Watanabe . |
| 3,987,959 | 10/1976 | Deards et al. . |
| 4,385,953 | 5/1983 | Beck . |
| 4,461,402 | 7/1984 | Fell et al. . |
| 4,570,820 | 2/1986 | Murphy . |
| 4,624,654 | 11/1986 | Boyd et al. . |
| 4,671,733 | 6/1987 | Krein . |
| 4,734,148 | 3/1988 | Meyer ........................ 156/251 |
| 4,754,914 | 7/1988 | Wischusen, III . |
| 4,759,742 | 7/1988 | Achelpohl . |
| 4,816,104 | 3/1989 | Benoit ........................ 156/251 |
| 4,850,508 | 7/1989 | Lee . |
| 4,871,046 | 10/1989 | Turner . |
| 5,007,744 | 4/1991 | Scarberry et al. . |
| 5,041,317 | 8/1991 | Greyvenstein . |
| 5,098,364 | 3/1992 | Schilling . |
| 5,110,005 | 5/1992 | Schilling . |
| 5,618,254 | 4/1997 | Derby ........................ 493/197 |

FOREIGN PATENT DOCUMENTS

| | | |
|---|---|---|
| 0294087 | 12/1988 | European Pat. Off. . |
| 1085853 | 10/1967 | United Kingdom . |

*Primary Examiner*—Michele K. Yoder
*Attorney, Agent, or Firm*—Michael A. O'Neil; Russell N. Rippamonti

[57] ABSTRACT

A tube of polyethylene or similar polymeric material having a continuous sidewall is extruded using conventional technology. Two horizontal gussets are formed from the sidewall of the tube, one on each side. The tube is flattened into a substantially flat workpiece. The workpiece is heat sealed at locations predetermined by the configuration of the container in which it is to be inserted. Concurrently with the heat sealing pass, or shortly thereafter, cuts are made to separate manufacturing waste material from the tube. The waste material is recycled into the feedstock of the extruder. The sealed workpiece is split axially into two substantially equal portions, each containing a complete gusset, thereby forming two completed liners.

Alternatively, one horizontal gusset is formed in the sidewall of the tube. As in the first embodiment, the workpiece is heat sealed at locations predetermined by the configuration of the container in which it is to be inserted. The sealed workpiece is split longitudinally on the side opposite of the gusset, thereby forming a completed liner.

6 Claims, 5 Drawing Sheets

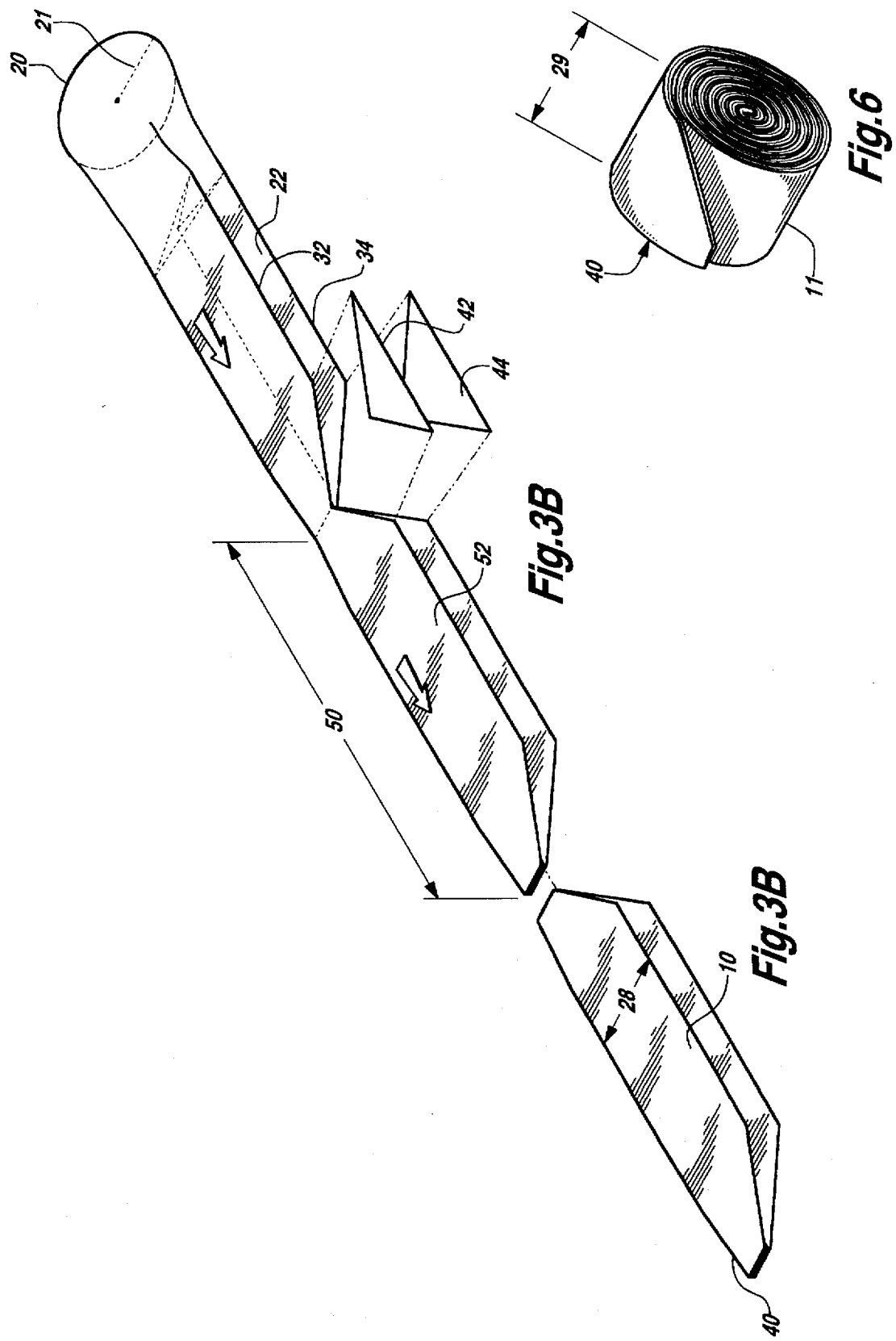

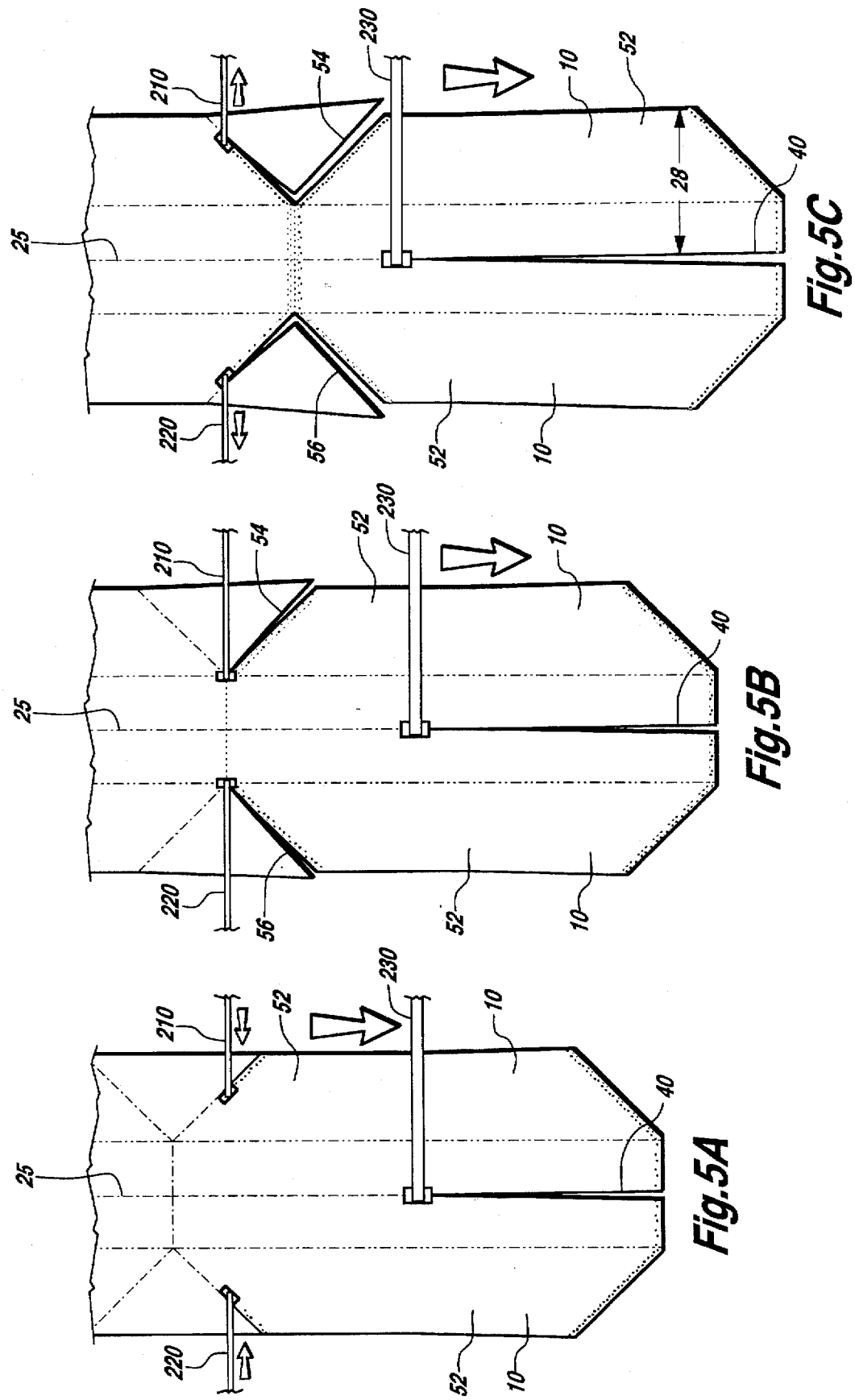

METHOD OF MAKING A LINER FOR ROLL-OFF WASTE CONTAINERS

TECHNICAL FIELD

This invention relates generally to liners for waste containers and, in particular, to liners for large roll-off waste containers and the manufacture thereof.

BACKGROUND OF THE INVENTION

As more public attention is given to the disposal of all types of waste, more effort is being made to assure that the waste disposal process works more efficiently and minimizes ecological damage. Waste is frequently accumulated and hauled to disposal in large roll-off containers. If a liner is not used, time consuming and expensive cleaning procedures may be required. Prudent management practices dictate that waste containers be lined with a disposable liner which is disposed of with the waste, thus reducing or eliminating contamination of the waste container by a particular load of waste material. Prior art liners resemble very large plastic bags which fit inside the containers.

Current commercially available roll-off waste container liners are wasteful of material in that the finished liner does not conform precisely to the interior configuration of the roll-off container with which it will be used. Prior art designs have opted for mass-production techniques which have led to a waste of material in the finished product. Examples of prior art liners for roll-off waste containers are disclosed in U. S. Pat. Nos. 5,098,364 and 5,110,005.

SUMMARY OF THE INVENTION

The present invention is a liner for a roll-off waste container which minimizes waste of material in the finished product because the finished product is relatively form fitting to the standard rectangular roll-off waste container. The present invention also includes a method of on line manufacture which minimizes waste of material in the finished liner.

The liner of the present invention is manufactured in an efficient continuous assembly line process. A tube of polyethylene or similar polymeric material having a continuous sidewall is extruded using conventional technology. Two horizontal gussets are formed from the sidewall of the tube, one on each side. The tube is flattened into a substantially flat workpiece. The tube is heat sealed at locations predetermined by the configuration of the container in which it is to be inserted. Concurrently with the heat sealing pass, or shortly thereafter, the workpiece is cut to separate manufacturing waste material from the tube. The waste material is recycled into the feedstock of the extruder. The sealed tube is split longitudinally into two substantially equal portions, each containing a complete gusset, thereby forming two completed liners.

Alternatively, the liner of the present invention may be manufactured by forming a single horizontal gusset in the sidewall of the tube. As in the first embodiment, the workpiece is heat sealed at locations predetermined by the configuration of the container in which it is to be inserted. The sealed workpiece is split longitudinally on the side opposite of the gusset, thereby forming a completed liner.

BRIEF DESCRIPTION OF THE DRAWINGS

A more complete understanding of the present invention and the advantages thereof may be had by reference to the following Detailed Description when taken in conjunction with the accompanying Drawings wherein:

FIG. 3B is a perspective view illustrating the manufacturing process of the second embodiment of the present invention;

FIGS. 5A, 5B and 5C are illustrations of sequential steps in the manufacturing process of the invention; and FIG. 6 is a perspective view of the liner of the present invention after completion of the manufacturing process showing the liner compactly rolled for transportation and/or storage.

DETAILED DESCRIPTION THE INVENTION

Figure 1:
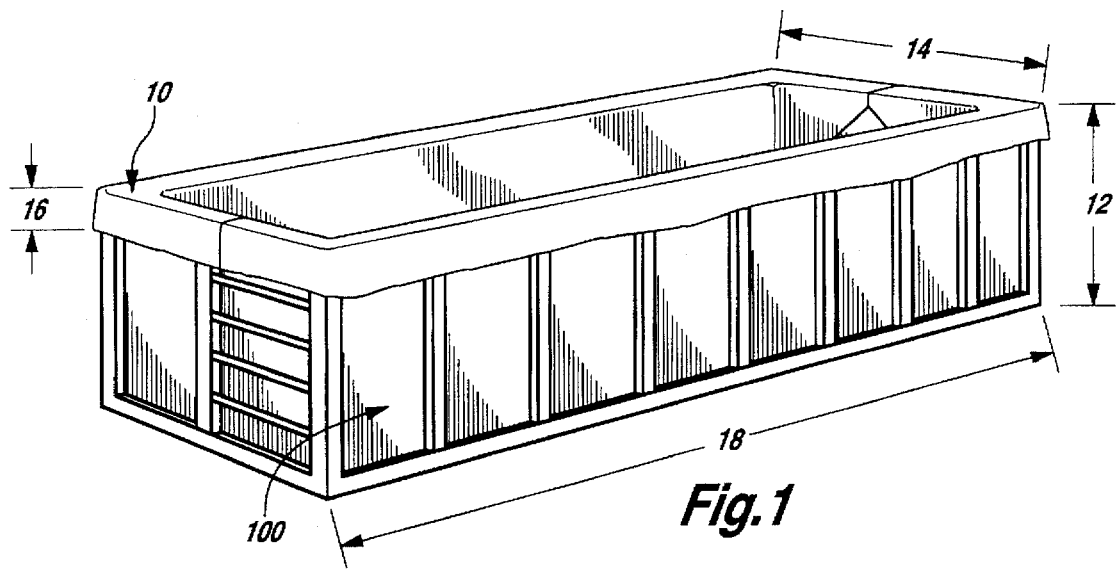
FIG. 1 is a perspective view of a liner incorporating the invention installed in a roll-off waste container.

Reference is now made to the Drawings wherein like reference characters denote like or similar parts throughout the three figures. Referring now to FIG. 1, the present invention comprises a waste container liner 10. Liner 10 is usually constructed of a polymeric material, such as polyethylene or polypropylene, although any desired flexible material may be used to suit the type of waste being handled. The liner 10 is installed in a waste container 100, such as a standard rectangular roll-off waste container, and is disposable with waste which is placed within the container 100 and liner 10. While a liner 10 is shown for one type of waste container 100, various sizes of liners 10 can be manufactured for other types of waste containers 100, such as dump trailers, rail gondolas and the like.

Figure 2:
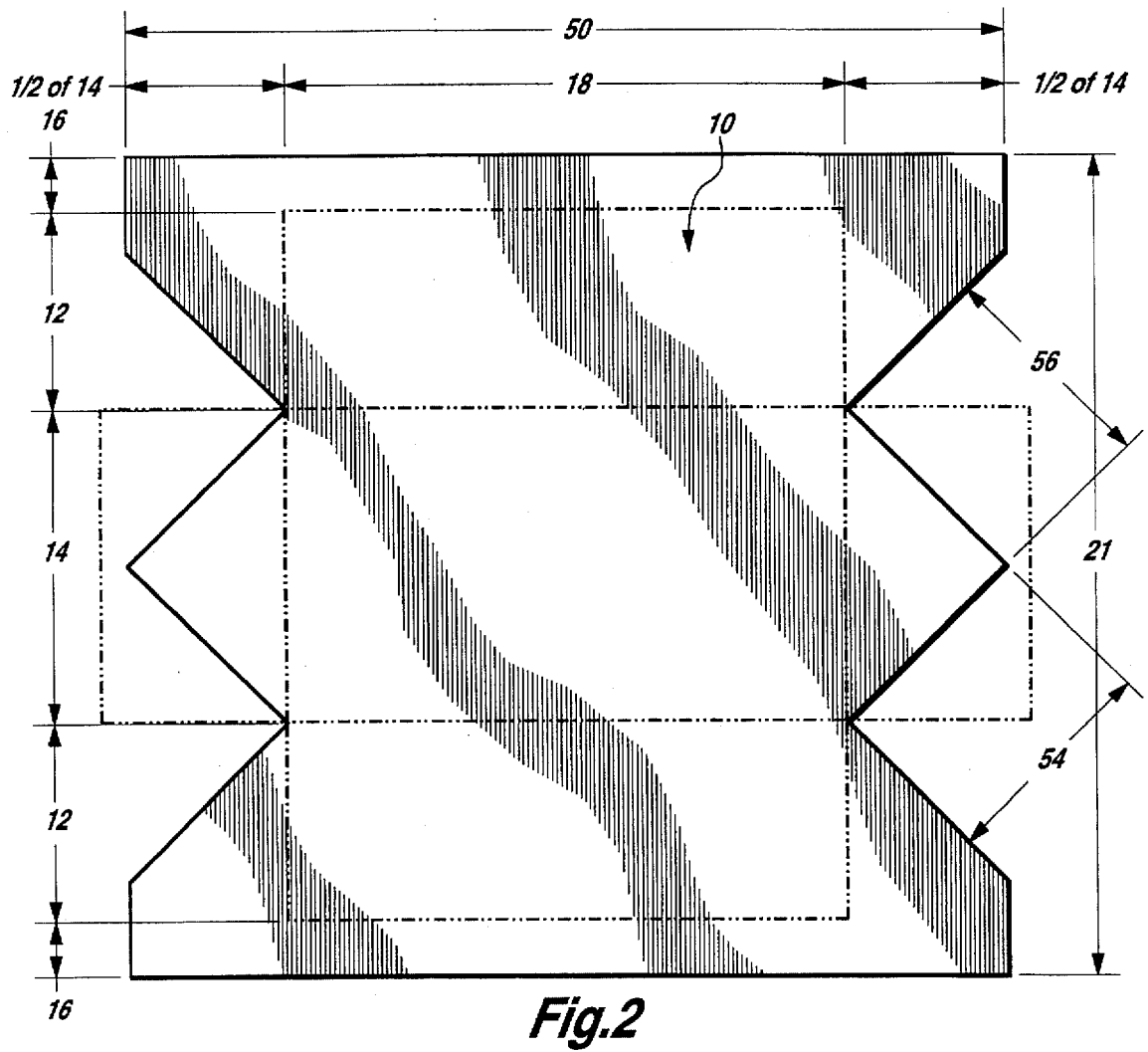
FIG. 2 is a development of the liner overlaid onto a development of the roll-off container.
Figure 3A:
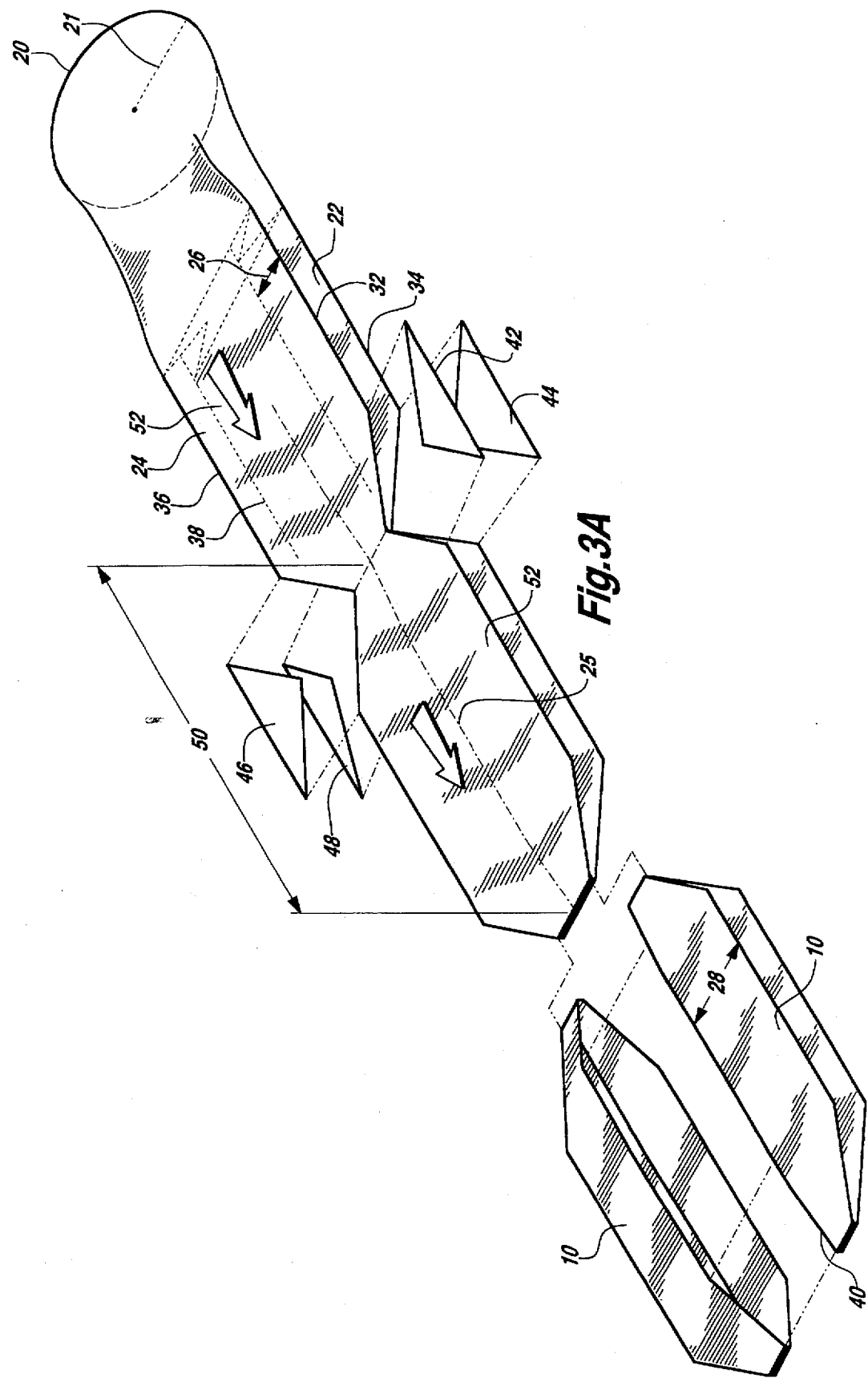
FIG. 3A is a perspective view illustrating the manufacturing process of the first embodiment of the present invention.

The design of liner 10 can be more readily understood by examining the method by which it is manufactured. FIGS. 3A, 3B, 4A, 4B, 5A, 5B and 5C show two of the methods by which liner 10 may be manufactured. Referring now to FIGS. 1 and 3A, the first manufacturing embodiment is illustrated. A tube 20 of polyethylene or other material comprising a continuous side wall is extruded by methods standard in the art. The extruded tube 20 has a predetermined radius 21 which is a function of the height 12 and width 14 of the roll-off waste container 100. As is shown in FIG. 2, the predetermined radius 21 determines a circumference which must be at least twice the sum of the following equation: [width 14 of the bottom of the roll-off waste container 100 plus twice the height 12 plus twice any desired overlap 16].

Referring again to FIG. 3A, a pair of opposing horizontal gussets 22 and 24 are formed in the extruded tube 20. The gussets project inwardly equidistant from the sides of the extruded tube 20. The size of projection 26 has a maximum such that the two parallel gussets 22 and 24 do not cross a longitudinal centerline 25 of the tube 20 and do not overlap. The distance of projection 26 is predetermined as a function of the width 14 of the roll-off waste container 100. After completion of the manufacturing process, the gusset is unfolded and it becomes the bottom of the liner. Therefore, distance of projection 26 preferably equals one-half the bottom width 14 of the roll-off waste container 100.

As the gussets 22 and 24 are formed, the tube is flattened into a substantially flat workpiece 52. Looking down the centerline 25 in the direction of the production line, as shown by the arrows in FIG. 4A, the tube 20 comprises a left horizontal gusset 22 and a right horizontal gusset 24. Left gusset 22 has an upper side 32 and a lower side 34. Right gusset 24 has an upper side 36 and a lower side 38.

Figures 4A, 4B:
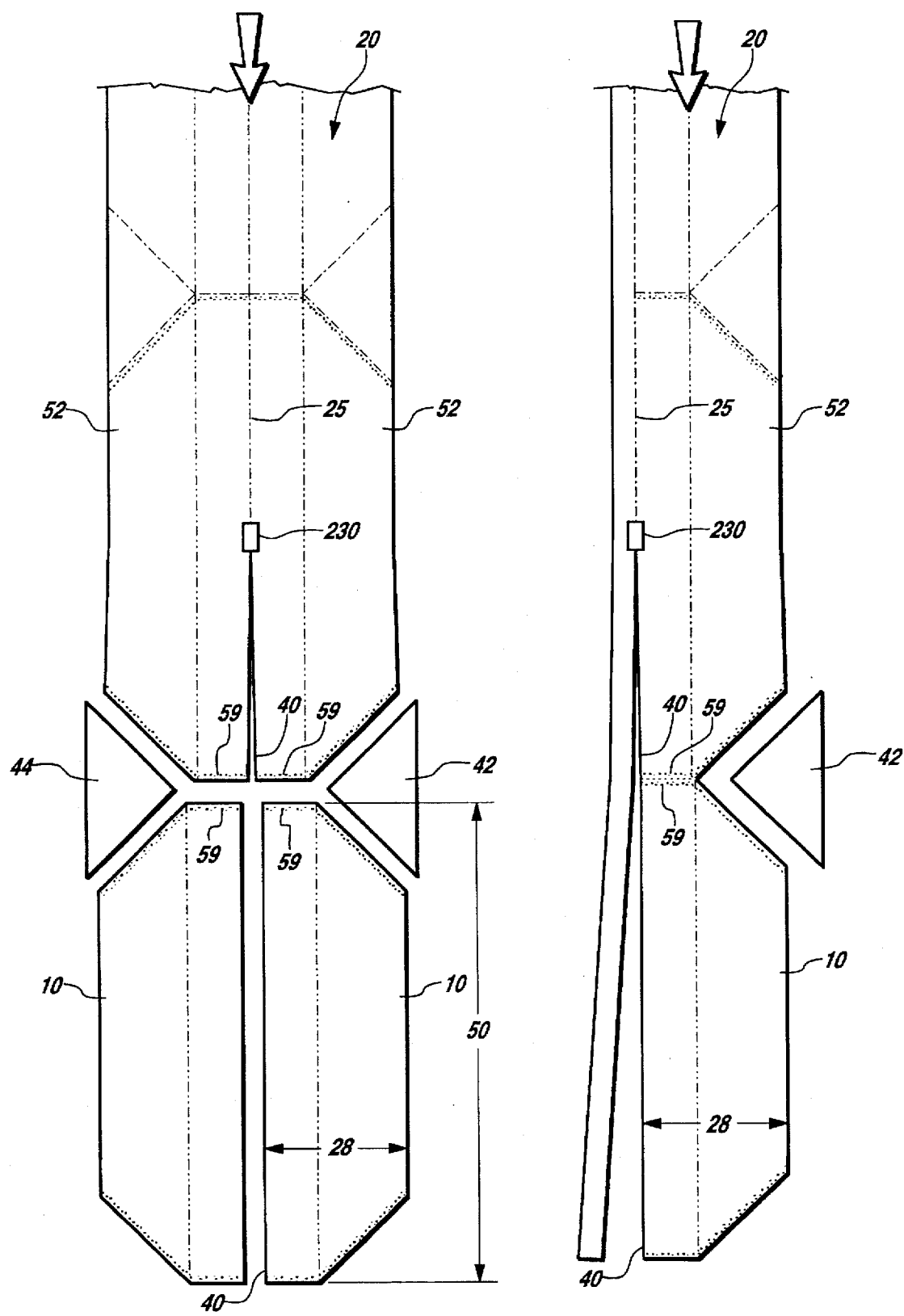
FIG. 4A is a further illustration of the manufacturing process of the first embodiment of the present invention.
FIG. 4B is a further illustration of the manufacturing process of the second embodiment of the present invention.

Turning now to FIGS. 4A, 5A, 5B and 5C, a heat sealing and cutting process is disclosed. FIG. 4A shows a continuous production line operation whereby one liner after another is formed from the extruded tube 20. As shown in FIGS. 3A and 4A, the manufacture of the liner forms waste pieces 42, 44, 46 and 48 which are preferably recycled into the raw polyethylene feed stock for the extruded tube 20. As shown in FIGS. 2, 3A and 4A, the overall length 50 of the liner is preferably equal to the length 18 of the roll-off waste container 100, plus the width 14. The sealing and cutting operations occur at predetermined intervals based on the desired overall length 50 of the liner to be manufactured.

FIG. 5A, 5B and 5C in conjunction with FIG. 4A disclose a manufacturing operation comprising the invention whereby two heat sealing and cutting devices ("heat sealer/cutter") 210 and 220 are employed concurrently to seal and cut portions of the flattened workpiece 52. In the preferred embodiment, a heat sealing operation is described. It is understood that other standard methods of sealing polymeric materials may be employed. A first heat sealer/cutter 210 starts at the exterior of the tube and proceeds inwardly toward the centerline 25 at a 45 degree angle. At a distance 54, predetermined by the square root of the sum of the following equation, [(½ width 14) squared plus (½ width 14) squared], the heat sealer/cutter 210 reverses course from the inward 45 degree angle course to an outward 45 degree angle course, terminating at the exterior of the tube, thereby sealing and cutting the upper left side 32 of left gusset 22. During its movement, heat sealer/cutter 210 simultaneously seals and cuts the bottom left side of tube 20 and the lower left side 34 of left gusset 22 in a similar manner. Concurrently, a second heat sealer/cutter 220 starts at the exterior of the tube and proceeds inwardly toward the centerline 25 at a 45 degree angle. At a predetermined distance 56, determined in the same manner as distance 54, the heat sealer/cutter 220 reverses course from the inward 45 degree angle course to an outward 45 degree angle course, terminating at the exterior of the tube, thereby sealing and cutting the upper right side 36 of right gusset 24. During its movement, heat sealer/cutter 220 simultaneously seals and cuts the bottom right side of tube 20 and the lower right side 38 of left gusset 24 in a similar manner.

A double heat sealer/perforator (not shown) seals and perforates the top 32 to bottom 34 and top 36 to bottom 38 of the workpiece. A double seal 59 is formed with perforations located between the seals. Such perforations provide for future separation of the liner from a consecutive liner being formed by the same method. The heat sealer/perforator starts at the interior termination point of the 45 degree angle seal and proceeds inwardly perpendicular to the centerline and terminates at the interior termination point of the corresponding 45 degree angle seal on the opposite side of the workpiece, thereby sealing the first end of the liner.

The heat sealer/cutter 210 and 220 may be any of the standard commercially available heat sealing and cutting devices. In one embodiment, the heat/sealer cutter 210 and 220 each have a pair of rollers, with a knife edge incorporated thereon, and a heated platen in between. A heated platen is inserted into the gusset 22 along a predetermined path. The rollers of heat sealer/cutter 210 compress the top 32 and bottom 34 of the workpiece against the upper and lower portions of the gusset 22 which are in turn pressed against the heated platen, fusing the layers of polyethylene to each other. Simultaneously therewith, as the rollers move across the top and bottom of the workpiece, the knife edge severs the first sealed tube from the extruded tube 20 and severing waste polyethylene pieces 42 and 44. Likewise, the heated platen is inserted into the gusset 24 along a predetermined path. The rollers of heat sealer/cutter 220 compress the top 36 and bottom 38 of the workpiece against the upper and lower portions of the gusset 24 which are in turn pressed against the heated platen, fusing the layers of polyethylene to each other. Simultaneously therewith, as the rollers move across the top and bottom of the workpiece, the knife edge severs waste polyethylene pieces 46 and 48. Waste pieces 42, 44, 46 and 48 are recycled back into the feedstock polyethylene of the extruded tube 20.

The heat sealer/perforator works in a similar manner to the heat sealer/cutter except that a toothed knife edge is used such that the liner material is cut in regular perforations instead of totally severed.

The workpiece is advanced a predetermined distance that is a function of the length 18 of the roll-off container 100. The heat sealing/cutting and heat sealing/perforating steps are repeated at the second end of the workpiece thereby sealing the second end of the liner and forming a first end of a consecutive liner being manufactured by the same method.

FIGS. 4A, 5A, 5B and 5C disclose an additional severing device 230 which splits the sealed tube in its axial direction into two substantially equal halves such that each half is a completed liner 10, with slit 40 being the top of the liner 10.

In some embodiments of the present invention there may be no perpendicular portion of the heat sealing/cutting operation because the height 12 of the roll-off waste container 100 equals one-half the width 14 of the roll-off waste container 100.

Turning now to FIGS. 1 and 3B, therein is illustrated a second embodiment of the manufacturing process. A single horizontal gusset 22 is formed in the sidewall of the extruded tube 20. The extruded tube 20 has a predetermined radius 21 which is a function of the height 12 and width 14 of the roll-off waste container 100. As is shown in FIG. 2, the predetermined radius 21 determines a circumference which must be at least the sum of the width 14 of the bottom of the roll-off waste container 100 plus twice the height 12 plus twice any desired overlap 16.

The gusset 22 projects inwardly from the side of the extruded tube 20. The distance of projection 26 is predetermined as a function of the width 14 of the roll-off waste container 100. After completion of the manufacturing process, the gusset is unfolded and it becomes the bottom of the liner. Therefore, distance of projection 26 preferably equals one-half the bottom width 14 of the roll-off waste container 100.

As the gusset 22 is formed, the tube is flattened into a substantially flat workpiece 52. The gusset 22 has a upper side 32 and a lower side 34.

Turning now to FIGS. 4B, 5A, 5B and 5C, a heat sealing and cutting process is disclosed. FIG. 4B shows a continuous production line operation whereby one liner after another is formed from the extruded tube 20. As shown in FIGS. 3B and 4B, the manufacture of the liner forms waste pieces 42 and 44 which are preferably recycled into the raw polyethylene feed stock for the extruded tube 20. As shown in FIGS. 2, 3B and 4B, the overall length 50 of the liner is preferably equal to the length 18 of the roll-off waste container 100, plus the width 14. The sealing and cutting operations occur at predetermined intervals based on the desired overall length 50 of the liner to be manufactured.

FIGS. 5A, 5B and 5C in conjunction with FIG. 4B disclose a manufacturing operation comprising the invention whereby a heat sealing and cutting device ("heat sealer/cutter") 210 is employed concurrently to seal and cut portions of the flattened workpiece 52. In the preferred embodiment, a heat sealing operation is described. It is understood that other standard methods of sealing polymeric materials may be employed. The heat sealer/cutter 210 starts at the exterior of the tube and proceeds inwardly toward the centerline 25 at a 45 degree angle. At a distance 54, predetermined by the square root of the sum of ½ width 14 squared plus ½ width 14 squared, the heat sealer/cutter 210 reverses course from the inward 45 degree angle course to an outward 45 degree angle course, terminating at the exterior of the tube, thereby sealing and cutting the upper left side 32 of left gusset 22. During its movement, heat sealer/cutter 210 simultaneously seals and cuts the bottom left side of tube 20 and the lower left side 34 of left gusset 22 in a similar manner.

The heat sealer/cutter 210 may be any of the standard commercially available heat sealing and cutting devices. In one embodiment, the heat/sealer cutter 210 has a pair of rollers, with a knife edge incorporated thereon, and a heated platen in between. A heated platen is inserted into the gusset 22 along a predetermined path. The rollers of heat sealer/cutter 210 compress the top 32 and bottom 34 of the workpiece against the upper and lower portions of the gusset 22 which are in turn pressed against the heated platen, fusing the layers of polyethylene to each other. Simultaneously therewith, as the rollers move across the top and bottom of the workpiece, the knife edge severs waste polyethylene pieces 42 and 44.

The heat sealer perforator works in a similar manner to the heat sealer/cutter except that a toothed knife edge is used such that the liner material is cut in regular perforations instead of totally severed.

The workpiece is advanced a predetermined distance that is a function of the length 18 of the roll-off container 100. The heat sealing/cutting and heat sealing/perforating steps are repeated at the second end of the liner thereby sealing the second end of the liner and forming a first end of a consecutive liner being manufactured by the same method.

FIG. 4B discloses an additional severing device 230 which splits the sealed tube longitudinally on the side opposite of the gusset, thereby forming a completed liner 10, with slit 40 being the top of the liner 10.

In some embodiments of the present invention there may be no perpendicular portion of the heat sealing/cutting operation because the height 12 of the roll-off waste container 100 equals one-half the width 14 of the roll-off waste container 100.

FIG. 6 illustrates an additional manufacturing step of folding the flattened liner 10 longitudinally in half. Then liner 10 is rolled into a bundle. The folding further reduces the width 28 of flattened completed liner 10 to width 29 of rolled bundle 11. Then liner 10 is thereby easily stored and transported.

FIGS. 1 and 6 demonstrate that liner 10 is safe and efficient. Rolled bundle 11 is removed from storage and unrolled, either next to or inside container 100, and unfolded, with split 40 facing upward. Split 40 is centered in container 100. Once this is accomplished, the installer simply pulls the edges of split 40 upward and outward, expanding gusseted panels 22 or 24, and securing the edges of split 40 over the edge of roll-off waste container 100 to the desired overlap 16.

A liner 10 for a roll-off waste container 100 is thus provided which is manufactured in a compact, rolled bundle 11, and which is easily stored. Installation is quickly and easily accomplished.

Although preferred embodiments of the present invention have been illustrated in the accompanying Drawings and in the foregoing Detailed Description, it will be appreciated by those skilled in the art that various modifications and rearrangements of the component manufacturing steps of the present invention are possible within the scope of the present invention.

I claim:

1. A continuous method for manufacture of a series of liners for a roll-off waste container, each of said liners having a first end and a second end, said method comprising the steps of:

a. extruding a tube of polymeric material having a continuous sidewall, interior and exterior surfaces, and a radius predetermined as a function of height and width dimensions of the roll-off waste container;

b. forming two parallel horizontal gussets from the sidewall of the tube, one on each side of the extruded tube,
   said gussets projecting inwardly equidistant from sides of the extruded tube a distance predetermined as a function of the width of the roll-off waste container,
   said distance of projection of the gussets having a maximum distance such that the two parallel horizontal gussets do not cross a longitudinal centerline of the tube and do not overlap,
   said gussets having an upper side and a lower side;

c. flattening the tube and the parallel gussets into a substantially flat workpiece,
   said workpiece having a longitudinal centerline, a top side and a bottom side, a gusset to the right of the centerline and a gusset to the left of the centerline, a first end and a second end and an interior surface and an exterior surface;

d. heat sealing a first portion of the top right side of the workpiece to a first portion of the upper side of the right gusset at a 45 degree angle to the centerline of the workpiece, wherein a heat sealing and cutting apparatus starts at the exterior of the workpiece and proceeds inwardly to the centerline of the workpiece forming a first heat seal, and concurrently therewith cutting waste polymeric material from the workpiece;

e. heat sealing a second portion of the top right side of the workpiece to a second portion of the upper side of the right gusset, wherein a heat sealing and cutting apparatus starts at the termination point of the first heat seal and proceeds outwardly at a 45 degree course away from the centerline until terminating at the exterior of the workpiece thereby forming a second heat seal, and concurrently therewith cutting waste polymeric material from the workpiece;

f. heat sealing a first portion of the bottom right side of the workpiece to a first portion of the lower side of the right gusset at a 45 degree angle to the centerline of the workpiece, wherein a heat sealing and cutting apparatus starts at a point on the exterior of the workpiece directly below the starting point for the first seal and proceeds inwardly to the centerline of the workpiece forming a third heat seal, and concurrently therewith cutting waste polymeric material from the workpiece;

g. heat sealing a second portion of the bottom right side of the workpiece to a second portion of the lower side of the right gusset, wherein a heat sealing and cutting apparatus starts at the terminating point of the third heat seal and proceeds outwardly at a 45 degree course away from the centerline until terminating at the exterior of the workpiece thereby forming a fourth heat seal, and concurrently therewith cutting waste polymeric material from the workpiece;

h. heat sealing a first portion of the top left side of the workpiece to a first portion of the upper side of the left gusset at a 45 degree angle to the centerline of the workpiece, wherein a heat sealing and cutting apparatus starts at the exterior of the workpiece and proceeds inwardly to the centerline of the workpiece forming a fifth heat seal, and concurrently therewith cutting waste polymeric material from the workpiece;

i. heat sealing a second portion of the top left side of the workpiece to a second portion of the upper side of the left gusset, wherein a heat sealing and cutting apparatus starts at the termination point of the fifth heat seal and proceeds outwardly at a 45 degree course away from the centerline until terminating at the exterior of the workpiece thereby forming a sixth heat seal, and concurrently therewith cutting waste polymeric material from the workpiece;

j. heat sealing a first portion of the bottom left side of the workpiece to a first portion of the lower side of the left gusset at a 45 degree angle to the centerline of the workpiece, wherein a heat sealing and cutting apparatus starts at a point of the exterior of the workpiece directly below the starting point for the fifth seal and proceeds inwardly to the centerline of the workpiece forming a seventh heat seal, and concurrently therewith cutting waste polymeric material from the workpiece;

k. heat sealing a second portion of the bottom left side of the workpiece to a second portion of the lower side of the left gusset, wherein a heat sealing and cutting apparatus starts at the termination point of the seventh seal and proceeds outwardly at a 45 degree course away from the centerline until terminating at the exterior of the workpiece thereby forming a eighth heat seal and sealing the first end of the workpiece, and concurrently therewith cutting waste polymeric material from the workpiece;

l. advancing the workpiece a predetermined distance and repeating steps d through k, thereby completely sealing the second end of the workpiece and sealing a first end of a consecutive liner that is being manufactured according to the same method; and m. subsequent to steps d through k, splitting the sealed workpiece along the longitudinal centerline into two substantially equal halves such that each half has one complete gusset and thereby forming two liners.

2. A continuous method for manufacture of a series of liners for a rectangular roll-off waste container, said roll off container having a width ("W") height ("H") and length ("L"), each of said liners having a first end and a second end, said method comprising the steps of:

a. extruding a tube of polymeric material having a continuous sidewall, interior and exterior surfaces, and a circumference at least the sum "W" plus "H";

b. forming two parallel horizontal gussets from the sidewall of the tube, one on each side of the extruded tube, said gussets projecting inwardly equidistant from sides of the extruded tube a distance at least ½W, said distance of projection of the gussets having a maximum distance such that the two parallel horizontal gussets do not cross a longitudinal centerline of the tube and do not overlap, said gussets having an upper side and a lower side;

c. flattening the tube and the parallel gussets into a substantially flat workpiece, said workpiece having a longitudinal centerline, a top side and a bottom side, a gusset to the right of the centerline and a gusset to the left of the centerline, a first end and a second end and an interior surface and an exterior surface;

d. heat sealing a first portion of the top right side of the workpiece to a first portion of the upper side of the right gusset at a 45 degree angle to the centerline of the workpiece, wherein a heat sealing and cutting apparatus starts at the exterior of the workpiece and proceeds inwardly to the centerline of the workpiece forming a first heat seal, and concurrently therewith cutting waste polymeric material from the workpiece;

e. heat sealing a second portion of the top right side of the workpiece to a second portion of the upper side of the right gusset, wherein a heat sealing and cutting apparatus starts at the termination point of the first heat seal and proceeds outwardly at a 45 degree course away from the centerline until terminating at the exterior of the workpiece thereby forming a second heat seal, and concurrently therewith cutting waste polymeric material from the workpiece;

f. heat sealing a first portion of the bottom right side of the workpiece to a first portion of the lower side of the right gusset at a 45 degree angle to the centerline of the workpiece, wherein a heat sealing and cutting apparatus starts at a point on the exterior of the workpiece directly below the starting point for the first seal and proceeds inwardly to the centerline of the workpiece forming a third heat seal, and concurrently therewith cutting waste polymeric material from the workpiece;

g. heat sealing a second portion of the bottom right side of the workpiece to a second portion of the lower side of the right gusset, wherein a heat sealing and cutting apparatus starts at the terminating point of the third heat seal and proceeds outwardly at a 45 degree course away from the centerline until terminating at the exterior of the workpiece thereby forming a fourth heat seal, and concurrently therewith cutting waste polymeric material from the workpiece;

h. heat sealing a first portion of the top left side of the workpiece to a first portion of the upper side of the left gusset at a 45 degree angle to the centerline of the workpiece, wherein a heat sealing and cutting apparatus starts at the exterior of the workpiece and proceeds inwardly to the centerline of the workpiece forming a fifth heat seal, and concurrently therewith cutting waste polymeric material from the workpiece;

i. heat sealing a second portion of the top left side of the workpiece to a second portion of the upper side of the left gusset, wherein a heat sealing and cutting apparatus starts at the termination point of the fifth heat seal and proceeds outwardly at a 45 degree course away from the centerline until terminating at the exterior of the workpiece thereby forming a sixth heat seal, and concurrently therewith cutting waste polymeric material from the workpiece;

j. heat sealing a first portion of the bottom left side of the workpiece to a first portion of the lower side of the left gusset at a 45 degree angle to the centerline of the workpiece, wherein a heat sealing and cutting apparatus starts at a point of the exterior of the workpiece directly below the starting point for the fifth seal and proceeds inwardly to the centerline of the workpiece forming a seventh heat seal, and concurrently therewith cutting waste polymeric material from the workpiece;

k. heat sealing a second portion of the bottom left side of the workpiece to a second portion of the lower side of the left gusset, wherein a heat sealing and cutting apparatus starts at the termination point of the seventh seal and proceeds outwardly at a 45 degree course away from the centerline until terminating at the exterior of the workpiece thereby forming a eighth heat seal and sealing the first end of the workpiece, and concurrently therewith cutting waste polymeric material from the workpiece;

l. advancing the workpiece a predetermined distance and repeating steps d through k, thereby completely sealing the second end of the workpiece and sealing a first end of a consecutive liner that is being manufactured according to the same method; and m. subsequent to steps d through k, splitting the sealed workpiece along the longitudinal centerline into two substantially equal halves such that each half has one complete gusset and thereby forming two liners.

3. A continuous method for manufacture of a series of liners for a roll-off waste container, each of said liners having a first end and a second end, said method comprising the steps of:

a. extruding a tube of polymeric material having a continuous sidewall, interior and exterior surfaces, and a radius predetermined as a function of height and width dimensions of the roll-off waste container;

b. forming two parallel horizontal gussets from the sidewall of the tube, one on each side of the extruded tube, said gussets projecting inwardly equidistant from sides of the extruded tube a distance predetermined as a function of the width of the roll-off waste container, said distance of projection of the gussets having a maximum distance such that the two parallel horizontal gussets do not cross a longitudinal centerline of the tube and do not overlap,
said gussets having an upper side and a lower side;

c. flattening the tube and the parallel gussets into a substantially flat workpiece,
said workpiece having a longitudinal centerline, a top side and a bottom side, a gusset to the right of the centerline and a gusset to the left of the centerline, a first end and a second end and an interior surface and an exterior surface;

d. heat sealing a first portion of the top right side of the workpiece to a first portion of the upper side of the right gusset at a 45 degree angle to the centerline of the workpiece, wherein a heat sealing and cutting apparatus starts at the exterior of the workpiece and proceeds inwardly toward the centerline of the workpiece forming a first heat seal, and concurrently therewith cutting waste polymeric material from the workpiece,
said first heat seal terminating its 45 degree course at a length predetermined as a function of the width of the roll-off waste container;

e. heat sealing a second portion of the top right side of the workpiece to a second portion of the upper side of the right gusset, wherein a heat sealing and cutting apparatus starts at the termination point of the first heat seal and proceeds at a 45 degree course outward and away from the centerline until terminating at the exterior of the workpiece thereby forming a second heat seal, and concurrently therewith cutting waste polymeric material from the workpiece;

f. heat sealing a first portion of the bottom right side of the workpiece to a first portion of the lower side of the right gusset at a 45 degree angle to the centerline of the workpiece, wherein a heat sealing and cutting apparatus starts at a point of the exterior of the workpiece directly below the starting point for the first seal and proceeds inwardly toward the centerline of the workpiece forming a third heat seal, and concurrently therewith cutting waste polymeric material from the workpiece,
said third heat seal terminating its 45 degree course at a length predetermined as a function of the width of the roll-off waste container;

g. heat sealing a second portion of the bottom right side of the workpiece to a second portion of the lower side of the right gusset, wherein a heat sealing and cutting apparatus starts at the termination point of the third heat seal and proceeds at a 45 degree course outward and away from the centerline until terminating at the exterior of the workpiece thereby forming a fourth heat seal, and concurrently therewith cutting waste polymeric material from the workpiece;

h. heat sealing a first portion of the top left side of the workpiece to a first portion of the upper side of the left gusset at a 45 degree angle to the centerline of the workpiece, wherein a heat sealing and cutting apparatus starts at the exterior of the workpiece and proceeds inwardly toward the centerline of the workpiece forming a fifth heat seal, and concurrently therewith cutting waste polymeric material from the workpiece,
said fifth heat seal terminating its 45 degree course at a length predetermined as a function of the width of the roll-off waste container;

i. heat sealing a second portion of the top left side of the tube to a second portion of the upper side of the left gusset, wherein a heat sealing and cutting apparatus starts at the termination point of the fifth heat seal and proceeds at a 45 degree course outward and away from the centerline until terminating at the exterior of the workpiece thereby forming a sixth heat seal, and concurrently therewith cutting waste polymeric material from the workpiece;

j. heat sealing a first portion of the bottom left side of the workpiece to a first portion of the lower side of the left gusset at a 45 degree angle to the centerline of the workpiece, wherein a heat sealing and cutting apparatus starts at a point on the exterior of the workpiece directly below the starting point for the fifth seal and proceeds inwardly toward the centerline of the workpiece forming a seventh heat seal, and concurrently therewith cutting waste polymeric material from the workpiece;
said seventh heat seal terminating its 45 degree course at a length predetermined as a function of the width of the roll-off waste container;

k. heat sealing a second portion of the bottom left side of the workpiece to a second portion of the lower side of the left gusset, wherein a heat sealing and cutting apparatus starts at the termination point of the seventh heat seal and proceeds at a 45 degree course outward and away from the centerline until terminating at the exterior of the workpiece thereby forming an eighth heat seal, and concurrently therewith cutting waste polymeric material from the workpiece;

l. double heat sealing a third portion of the top side of the workpiece to a third portion of the bottom side of the workpiece, wherein a heat sealing apparatus starts at the termination point of the first and third heat seals and proceeds inwardly perpendicular to the centerline and terminates at the termination point of the fifth and seventh heat seals thereby forming a ninth heat seal that seals the first end of the workpiece;

m. perforating the workpiece between the double seals of the ninth heat seal for future separation of the liner from a consecutive liner that is being formed according to the same method; and n. advancing the workpiece a predetermined distance and repeating steps d through m, thereby sealing the second end of the workpiece and sealing a first end of the consecutive liner that is being manufactured according to the same method; and o. subsequent to steps d through k, splitting the sealed workpiece along the longitudinal centerline into two substantially equal halves such that each half has one complete gusset and thereby forming two complete liners.

4. A continuous method for manufacture of a series of liners for a roll-off waste container, said roll-off container having a width ("W"), height ("H"), and length ("L"), each of said liners having a first end and a second end, said method comprising the steps of:

a. extruding a tube of polymeric material having a continuous sidewall, interior and exterior surfaces, and a circumference at least the sum of "W" plus "H";

b. forming two parallel horizontal gussets from the sidewall of the tube, one on each side of the extruded tube, said gussets projecting inwardly equidistant from sides of the extruded tube a distance at least "½W", said distance of projection of the gussets having a maximum distance such that the two parallel horizontal gussets do not cross a longitudinal centerline of the tube and do not overlap, said gussets having an upper side and a lower side;

c. flattening the tube and the parallel gussets into a substantially flat workpiece, said workpiece having a longitudinal centerline, a top side and a bottom side, a gusset to the right of the centerline and a gusset to the left of the centerline, a first end and a second end and an interior surface and an exterior surface;

d. heat sealing a first portion of the top right side of the workpiece to a first portion of the upper side of the right gusset at a 45 degree angle to the centerline of the workpiece, wherein a heat sealing and cutting apparatus starts at the exterior of the workpiece and proceeds inwardly toward the centerline of the workpiece forming a first heat seal, and concurrently therewith cutting waste polymeric material from the workpiece, said first heat seal terminating its 45 degree course at a length determined by calculating the square root of the sum of (½"W") squared plus (½"W") squared;

e. heat sealing a second portion of the top right side of the workpiece to a second portion of the upper side of the right gusset, wherein a heat sealing and cutting apparatus starts at the termination point of the first heat seal and proceeds at a 45 degree course outward and away from the centerline until terminating at the exterior of the workpiece thereby forming a second heat seal, and concurrently therewith cutting waste polymeric material from the workpiece;

f. heat sealing a first portion of the bottom right side of the workpiece to a first portion of the lower side of the right gusset at a 45 degree angle to the centerline of the workpiece, wherein a heat sealing and cutting apparatus starts at a point of the exterior of the workpiece directly below the starting point for the first seal and proceeds inwardly toward the centerline of the workpiece forming a third heat seal, and concurrently therewith cutting waste polymeric material from the workpiece, said third heat seal terminating its 45 degree course at a length determined by calculating the square root of the sum of (½"W") squared plus (½"W") squared;

g. heat sealing a second portion of the bottom right side of the workpiece to a second portion of the lower side of the right gusset, wherein a heat sealing and cutting apparatus starts at the termination point of the third heat seal and proceeds at a 45 degree course outward and away from the centerline until terminating at the exterior of the workpiece thereby forming a fourth heat seal, and concurrently therewith cutting waste polymeric material from the workpiece;

h. heat sealing a first portion of the top left side of the workpiece to a first portion of the upper side of the left gusset at a 45 degree angle to the centerline of the workpiece, wherein a heat sealing and cutting apparatus starts at the exterior of the workpiece and proceeds inwardly toward the centerline of the workpiece forming a fifth heat seal, and concurrently therewith cutting waste polymeric material from the workpiece, said fifth heat seal terminating its 45 degree course at a length determined by calculating the square root of the sum of (½"W") "W" squared plus (½"W") squared;

i. heat sealing a second portion of the top left side of the tube to a second portion of the upper side of the left gusset, wherein a heat sealing and cutting apparatus starts at the termination point of the fifth heat seal and proceeds at a 45 degree course outward and away from the centerline until terminating at the exterior of the workpiece thereby forming a sixth heat seal, and concurrently therewith cutting waste polymeric material from the workpiece;

j. heat sealing a first portion of the bottom left side of the workpiece to a first portion of the lower side of the left gusset at a 45 degree angle to the centerline of the workpiece, wherein a heat sealing and cutting apparatus starts at a point on the exterior of the workpiece directly below the starting point for the fifth seal and proceeds inwardly toward the centerline of the workpiece forming a seventh heat seal, and concurrently therewith cutting waste polymeric material from the workpiece;

said seventh heat seal terminating its 45 degree course at a length determined by calculating the square root of the sum of (½"W") squared plus (½"W") squared;

k. heat sealing a second portion of the bottom left side of the workpiece to a second portion of the lower side of the left gusset, wherein a heat sealing and cutting apparatus starts at the termination point of the seventh heat seal and proceeds at a 45 degree course outward and away from the centerline until terminating at the exterior of the workpiece thereby forming a eighth heat seal, and concurrently therewith cutting waste polymeric material from the workpiece;

l. double heat sealing a third portion of the top side of the workpiece to a third portion of the bottom side of the workpiece, wherein a heat sealing apparatus starts at the termination point of the first and third heat seals and proceeds inwardly perpendicular to the centerline and terminates at the termination point of the fifth and seventh heat seals thereby forming a ninth heat seal that seals the first end of the workpiece;

m. perforating the workpiece between the double seals of the ninth heat seal for future separation of the liner from a consecutive liner that is being formed according to the same method;

n. advancing the workpiece a predetermined distance and repeating steps d through m, thereby sealing the second end of the workpiece and sealing a first end of the consecutive liner that is being manufactured according to the same method; and o. subsequent to steps d through k, splitting the sealed workpiece along the longitudinal centerline into two substantially equal halves such that each half has one complete gusset and thereby forming two complete liners.

5. A continuous method for manufacture of a series of liners for a rectangular roll-off waste container, said roll-off container having a bottom width ("W"), a length ("L"), and height ("H"), each of said liners having a first end and a second end, said method comprising the steps of:

a. providing a continuous tubular gusseted workpiece of polymeric material comprising a pair of opposed substantially planar panels and a pair of opposed gusseted panels connected to said pair of planar panels by four corner longitudinally extending fold lines, each of said gusseted panels projecting inwardly equidistant from the corner fold lines a distance at least ½ of "W," said distance of projection of the gusseted panels having a maximum distance such that the two panels do not cross a longitudinal centerline of the workpiece and do not overlap, said gusseted panels having an upper side and a lower side, and said continuous workpiece having a perimeter at least the sum of "W" plus "H," a longitudinal centerline, a top side and a bottom side, a gusseted panel to the right of the centerline and a gusseted panel to the left of the centerline, a first end, and a second end;

b. advancing the continuous workpiece along a predetermined path of travel;

c. providing two cutting and sealing apparatuses;

d. positioning a first cutting and sealing apparatus in engagement with the corner fold lines of the right gusseted panel and positioning a second cutting and sealing apparatus in engagement with the corner fold lines of the left gusseted panel;

e. heat sealing a first portion of the top right side of the workpiece to a first portion of the upper side of the right gusset at a 45 degree angle to the centerline of the workpiece, wherein the first heat sealing and cutting apparatus starts at the corner fold line and proceeds inwardly to the centerline of the workpiece forming a first heat seal; and heat sealing a second portion of the top right side of the workpiece to a second portion of the upper side of the right gusset, wherein the first heat sealing and cutting apparatus starts at the termination point of the first heat seal and proceeds outwardly at a 45 degree course away from the centerline until terminating at the corner fold line thereby forming a second heat seal;

f. concurrently with step e, heat sealing a first portion of the bottom right side of the workpiece to a first portion of the lower side of the right gusset at a 45 degree angle to the centerline of the workpiece, wherein the first heat sealing and cutting apparatus starts at a point on the corner fold line in registration with the starting point for the first seal and proceeds inwardly to the centerline of the workpiece forming a third heat seal, and heat sealing a second portion of the bottom right side of the workpiece to a second portion of the lower side of the right gusset, wherein the first heat sealing and cutting apparatus starts at the terminating point of the third heat seal and proceeds outwardly at a 45 degree course away from the centerline until terminating at the corner fold line thereby forming a fourth heat seal;

g. heat sealing a first portion of the top left side of the workpiece to a first portion of the upper side of the left gusset at a 45 degree angle to the centerline of the workpiece, wherein the second heat sealing and cutting apparatus starts at the fold line and proceeds inwardly to the centerline of the workpiece forming a fifth heat seal, and heat sealing a second portion of the top left side of the workpiece to a second portion of the upper side of the left gusset, wherein the second heat sealing and cutting apparatus starts at the termination point of the fifth heat seal and proceeds outwardly at a 45 degree course away from the centerline until terminating at the corner fold line thereby forming a sixth heat seal;

h. concurrently with step g, heat sealing a first portion of the bottom left side of the workpiece to a first portion of the lower side of the left gusset at a 45 degree angle to the centerline of the workpiece, wherein the second heat sealing and cutting apparatus starts at the corner fold line of the workpiece in registration with the starting point for the fifth seal and proceeds inwardly to the centerline of the workpiece forming a seventh heat seal, and heat sealing a second portion of the bottom left side of the workpiece to a second portion of the lower side of the left gusset, wherein the second heat sealing and cutting apparatus starts at the termination point of the seventh seal and proceeds outwardly at a 45 degree course away from the centerline until terminating at the longitudinal corner fold line thereby forming a eighth heat seal and sealing the first end of the workpiece, i. advancing the workpiece a predetermined distance and repeating steps e through h, thereby completely sealing the second end of the workpiece and sealing a first end of a consecutive liner that is being manufactured according to the same method; and j. subsequent to steps d through h, splitting the sealed workpiece along the longitudinal centerline into two substantially equal halves such that each half has one complete gusseted panel and thereby forming two liners.

6. A continuous method for manufacture of a series of liners for a rectangular roll-off waste container, said roll-off container having a bottom width ("W"), a length ("L"), and height ("H"), each of said liners having a first end and a second end, said method comprising the steps of:

a. providing a continuous tubular gusseted workpiece of polymeric material comprising a pair of opposed substantially planar panels and a pair of opposed gusseted panels connected to said pair of planar panels by four corner longitudinally extending fold lines, each of said gusseted panels projecting inwardly equidistant from the corner fold lines a distance at least ½of "W," said distance of projection of the gusseted panels having a maximum distance such that the two panels do not cross a longitudinal centerline of the workpiece and do not overlap, said gusseted panels having an upper side and a lower side, and said continuous workpiece having a perimeter at least the sum of "W" plus "H", a longitudinal centerline, a top side and a bottom side, a gusseted panel to the right of the centerline and a gusseted panel to the left of the centerline, a first end, and a second end;

b. advancing the continuous workpiece along a predetermined path of travel;

c. providing two cutting and sealing apparatuses;

d. positioning a first cutting and sealing apparatus in engagement with the corner fold lines of the right gusseted panel and positioning a second cutting and sealing apparatus in engagement with the corner fold lines of the left gusseted panel;

e. heat sealing a first portion of the top right side of the workpiece to a first portion of the upper side of the right gusset at a 45 degree angle to the centerline of the workpiece, wherein the first heat sealing and cutting apparatus starts at the corner fold line and proceeds inwardly toward the centerline of the workpiece forming a first heat seal, said first heat seal terminating its 45 degree course at a length determined by calculating the square root of the sum of (½"W") "W" squared plus (½"W") squared, and heat sealing a second portion of the top right side of the workpiece to a second portion of the upper side of the right gusset, wherein the first heat sealing and cutting apparatus starts at the termination point of the first heat seal and proceeds outwardly at a 45 degree course away from the centerline until terminating at the corner fold line thereby forming a second heat seal;

f. concurrently with step e, heat sealing a first portion of the bottom right side of the workpiece to a first portion of the lower side of the right gusset at a 45 degree angle to the centerline of the workpiece, wherein the first heat sealing and cutting apparatus starts at a point on the corner fold line in registration with the starting point for the first seal and proceeds inwardly toward the centerline of the workpiece forming a third heat seal, said third heat seal terminating its 45 degree course at a length determined by calculating the square root of the sum of (½"W") squared plus (½"W") squared, and heat sealing a second portion of the bottom right side of the workpiece to a second portion of the lower side of the right gusset, wherein the first heat sealing and cutting apparatus starts at the terminating point of the third heat seal and proceeds outwardly at a 45 degree course away from the centerline until terminating at the corner fold line thereby forming a fourth heat seal;

g. heat sealing a first portion of the top left side of the workpiece to a first portion of the upper side of the left gusset at a 45 degree angle to the centerline of the workpiece, wherein the second heat sealing and cutting apparatus starts at the fold line and proceeds inwardly toward the centerline of the workpiece forming a fifth heat seal, said fifth heat seal terminating its 45 degree course at a length determined by calculating the square root of the sum of (½"W") squared plus (½"W") squared, and heat sealing a second portion of the top left side of the workpiece to a second portion of the upper side of the left gusset, wherein the second heat sealing and cutting apparatus starts at the termination point of the fifth heat seal and proceeds outwardly at a 45 degree course away from the centerline until terminating at the corner fold line thereby forming a sixth heat seal;

h. concurrently with step g, heat sealing a first portion of the bottom left side of the workpiece to a first portion of the lower side of the left gusset at a 45 degree angle to the centerline of the workpiece, wherein the second heat sealing and cutting apparatus starts at the corner fold line of the workpiece in registration with the starting point for the fifth seal and proceeds inwardly toward the centerline of the workpiece forming a seventh heat seal, said seventh heat seal terminating its 45 degree course at a length determined by calculating the square root of the sum of (½"W") squared plus (½"W") squared, and heat sealing a second portion of the bottom left side of the workpiece to a second portion of the lower side of the left gusset, wherein the second heat sealing and cutting apparatus starts at the termination point of the seventh seal and proceeds outwardly at a 45 degree course away from the centerline until terminating at the longitudinal corner fold line thereby forming a eighth heat seal;

i. double heat sealing a third portion of the top side of the workpiece to a third portion of the bottom side of the workpiece, wherein a heat sealing apparatus starts at the termination point of the first and third heat seals and proceeds inwardly perpendicular to the centerline and terminates at the termination point of the fifth and seventh heat seals thereby forming a ninth heat seal that seals the first end of the workpiece;

j. perforating the workpiece between the double seals of the ninth heat seal for future separation of the liner from a consecutive liner that is being formed according to the same method; and k. advancing the workpiece a predetermined distance and repeating steps d through j, thereby sealing the second end of the workpiece and sealing a first end of the consecutive liner that is being manufactured according to the same method; and l. subsequent to steps d through k, splitting the sealed workpiece along the longitudinal centerline into two substantially equal halves such that each half has one complete gusset and thereby forming two complete liners.

* * * * *